United States Patent [19]
Dorius et al.

[11] Patent Number: 5,872,686
[45] Date of Patent: Feb. 16, 1999

[54] MAGNETIC STORAGE SYSTEM HAVING AN IMPROVED SLIDER HAVING ROUNDED CORNERS TO MINIMIZE DISK DAMAGE

[75] Inventors: Lee K. Dorius; Donald R. Gillis, both of San Jose; Mike Suk, Milpitas, all of Calif.

[73] Assignee: International Business Machines Corporation, Armonk, N.Y.

[21] Appl. No.: 940,711

[22] Filed: Sep. 30, 1997

[51] Int. Cl.⁶ ........................................ G11B 5/60
[52] U.S. Cl. ............................................. 360/103
[58] Field of Search ................................. 360/103

[56] References Cited

U.S. PATENT DOCUMENTS

| | | | |
|---|---|---|---|
| 3,922,776 | 12/1975 | Alger | 360/103 |
| 4,315,292 | 2/1982 | Kronfeld | 360/122 |
| 4,928,195 | 5/1990 | Ezaki et al. | 360/103 |
| 5,136,445 | 8/1992 | Zak | 360/103 |
| 5,301,077 | 4/1994 | Yamaguchi | 360/103 |
| 5,404,256 | 4/1995 | White | 360/103 |
| 5,416,656 | 5/1995 | Fukuda et al. | 360/103 |
| 5,488,524 | 1/1996 | Cunningham | 360/103 |
| 5,516,323 | 5/1996 | Carlson et al. | 451/28 |

FOREIGN PATENT DOCUMENTS

| | | | |
|---|---|---|---|
| 0129336 | 12/1984 | European Pat. Off. | G11B 5/60 |
| 0583985A2 | 2/1994 | European Pat. Off. | G11B 5/60 |
| 0583989A2 | 2/1994 | European Pat. Off. | G11B 5/60 |
| 54-126521 | 10/1979 | Japan | G11B 17/32 |
| 56-101674 | 8/1981 | Japan | G11B 17/32 |
| 61-24076 | 2/1986 | Japan | G11B 21/21 |
| 63-64620 | 3/1988 | Japan | G11B 5/60 |
| 63-263677 | 10/1988 | Japan | G11B 21/21 |
| 2-134717 | 8/1990 | Japan | G11B 5/60 |
| 6-176321 | 6/1994 | Japan | G11B 5/31 |

OTHER PUBLICATIONS

Anonymous, Air–Bearing Configuration with Blended Edge, IBM Technical Disclosure Bulletin, vol. 31, No. 12, May 1989, pp. 25–26.

Anonymous, Slider Feature Changes to Increase Shock Resistance, IBM Technical Disclosure Bulletin, vol. 37, No. 02A, Feb. 1994, pp. 343–344.

Anonymous, Slider with Cornered Air Bearing Surface, IBM Technical Disclosure Bulletin, vol. 37, No. 05, May 1994, pp. 577–578.

Anonlymous, Pre–Conditioning of Sliders to Minimize Disk Damage During Load/Unload, vol. 39, No. 10, Oct. 1996, p. 185.

*Primary Examiner*—A. J. Heinz
*Attorney, Agent, or Firm*—Monica D. Lee

[57] ABSTRACT

A magnetic storage system having an air bearing slider designed to minimize disk damage. The magnetic storage system may include a load/unload structure for loading or unloading the slider when the spindle motor is powered down. The air bearing slider includes an air bearing surface and at least one non-air bearing surface. For example, the non-air bearing surface may include a first etch surface and/or a second etch surface. The non-air bearing surface has at least one rounded corner. The non-air bearing surface may also have at least one rounded edge.

22 Claims, 4 Drawing Sheets

MAGNETIC STORAGE SYSTEM HAVING AN IMPROVED SLIDER HAVING ROUNDED CORNERS TO MINIMIZE DISK DAMAGE

BACKGROUND OF THE INVENTION

1. Field of the Invention

This invention relates generally to magnetic storage systems, and more particularly, to air bearing sliders for use in magnetic storage systems.

2. Description of Related Art

A magnetic storage system typically includes one or more magnetic disks with at least one data recording surface having a plurality of concentric tracks for storing data. A spindle motor and spindle motor controller rotate the disk(s) at a selected RPM such that at least one read/write transducer or "head" per recording surface can read data from or write data to each recording surface. The data read or written from each recording surface is processed by a read/write channel. The transducer is supported by an air bearing slider which has a top surface attached to an actuator assembly via a suspension, and a bottom surface having an air bearing design of a desired configuration to provide favorable flying height characteristics. During the operation of the magnetic storage device, the air bearing slider is positioned in close proximity above the desired data track by an actuator assembly. The movement of the actuator assembly above the disk surface is controlled by a servo system.

Conventional magnetic storage systems may operate in a contact start/stop mode where the slider and transducer are only in contact with the recording surface when the spindle motor is powered down. As the disk begins to rotate, an air flow is generated which enters the leading edge of the slider and flows in the direction of the trailing edge of the slider. The air flow generates a positive pressure on the air bearing surface of the slider to lift the slider above the recording surface. As the spindle motor reaches the operating RPM, the slider is maintained at a nominal flying height over the recording surface by a cushion of air. Then, as the spindle motor spins down, the flying height of the slider drops until the slider is once again in contact with the disk.

FIGS. 1A–1B illustrate a prior art slider design as disclosed in U.S. Pat. No. 5,404,256, issued Apr. 4, 1995 to James W. White, entitled "TRANSVERSE AND NEGATIVE PRESSURE CONTOUR GAS BEARING SLIDER." The air bearing design of slider 100 is suitable for a magnetic storage system that operates in a contact start/stop mode. Slider 100 is designed to provide uniform and controllable flying height through a range of skew angles.

According to FIGS. 1A–1B, pads 122 each include a generally U-shaped transverse pressure contour (TPC) section 128 surrounding an air bearing surface 134. TPC sections 128 have a substantially planar surface for creating a gas bearing effect. A negative pressure pad 126 is defined by a substantially planar surface that includes a recess 140 open at a trailing end 125 of slider 100. The negative pressure pad 126 may also include one or more air bearing surfaces 142. An ambient pressure reservoir 130 defines a cavity 144 having a depth and configuration sufficient to maintain substantial ambient pressure in cavity 144 during movement of the disk. Ambient pressure reservoir 130 also includes a non-tapered inlet along a leading edge 123.

As shown in FIGS. 1A–1B, slider 100 has sharp corners and edges and air bearing surfaces 134 and 142 also have sharp corners. One drawback of having an air bearing surface with sharp edges and corners is that during the contact start or stop, the sharp edges of the air bearing surface may cause deformations on the surface of the disk as the slider is being lifted off or placed onto the disk surface. One approach to reduce the amount of damage resulting from the slider-to-disk contact is to round the edges of the air bearing rails as shown in U.S. Pat. No. 4,928,195 or to provide air bearing rails with beveled edges as shown in U.S. Pat. No. 5,301,077. By rounding or beveling the air bearing rail edges, unwanted wear of the disk surface is reduced. However, when the edges of the air bearing surface are rounded, the slider flying height may be adversely affected.

In many conventional magnetic storage systems that operate in a contact start/stop mode, the slider drags on the disk surface until sufficient air-bearing is generated to lift the slider off the disk surface. This start-stop process leads to two problems at the head/disk interface: (1) wear of the disk surface (also referred to as wear durability) and (2) adhesion of the slider to the disk surface during start-up (also referred to as stiction). One approach to circumvent the undesirable issues associated with wear durability and stiction is to use load/unload technology.

Typically, load/unload technology includes a ramp for the slider/suspension assembly at the outer diameter of the disk where the slider is "parked" securely while the spindle motor is powered down. During normal operation, the disk speed is allowed to reach a selected RPM (which may be below the normal operating RPM) before the head is "loaded" from the ramp onto the disk. As the slider approaches the disk surface, an air cushion is generated by the disk's rotation. The slider can also be "unloaded" from the disk's surface onto the ramp. In this manner, the slider is positioned over the disk without substantial contact with the disk surface. By reducing the contact between the slider and the disk surface, the interface life can be substantially increased. Because the slider and transducer are generally not in contact with the disk surface during start-up, stiction is not a problem. As such, a smooth (or non-textured) disk surface may be used with load/unload designs to decrease the head-to-disk spacing in order to increase the areal density of the disk.

One drawback associated with load/unload designs is that when the slider is being "loaded" onto the disk surface, the corner of the slider may contact the disk surface before an air-bearing can be developed. This contact results in both slider wear and damage to the disk surface.

Furthermore, when the slider is being "unloaded" from the cushion of air above the disk surface onto the ramp, sliders having negative pressure air bearing designs generally resist being pulled away from the disk surface. The negative pressure region of the slider has a tendency to pull the slider toward the disk surface by a suction force as the suspension attempts to lift the slider. Eventually, the slider/suspension assembly overcomes this suction force in order to lift the slider onto the ramp. As soon as the suction force is released, the stored energy (often referred to as spring energy) within the suspension assembly causes the suspension to snap the slider away from the disk surface. This snapping motion causes the slider to oscillate or vibrate. Typically, at this point the slider is just starting to ride up the ramp such that the corners, and possibly the edges, of the vibrating slider may contact the disk surface with sufficient force causing damage to the disk surface.

SUMMARY OF THE INVENTION

It is desirable to design a magnetic storage system having an air bearing slider that minimizes disk damage.

It is further desirable to design a magnetic storage system having an air bearing slider that minimizes disk damage without adversely affecting the flying height sensitivity of the slider.

Another desire is to design a magnetic storage system having an air bearing slider that minimizes disk damage resulting from the loading and unloading of the slider onto the disk surface.

A magnetic storage system is described. The magnetic storage system includes at least one storage disk system having a data surface of concentric data tracks. The disks are attached to a spindle motor for rotation. A transducer, supported by a slider, is configured to read or write data from the data surface. The slider includes a support structure and a first etch surface. The first etch surface has a first etch depth with respect to the air bearing surface. The first etch surface has at least one rounded corner. An actuator assembly is coupled to the slider via a suspension to move to slider relative to the data surface.

Another aspect of the present invention includes a load/unload structure disposed at a perimeter of the disk such that the slider is loaded or unloaded onto the structure when the spindle motor is powered down.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1A:
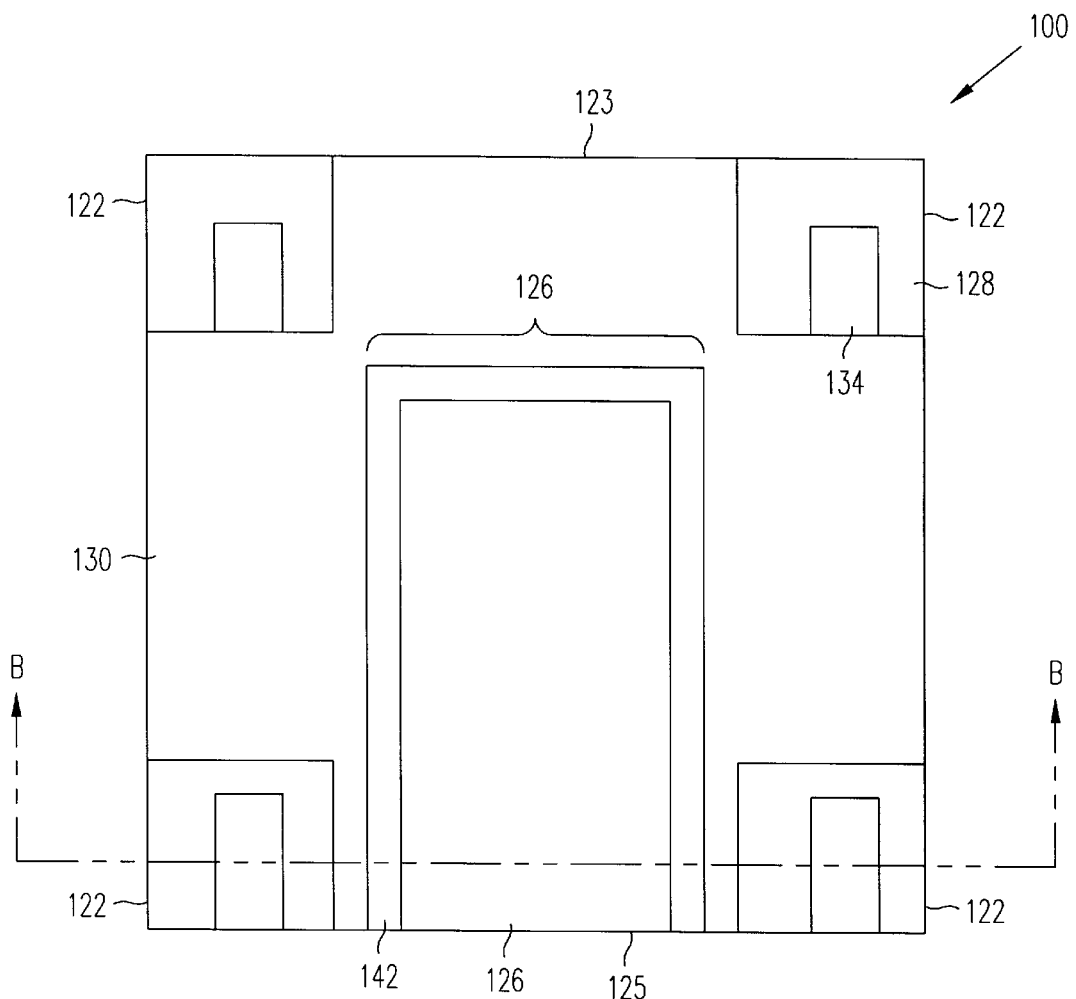
FIGS. 1A–1B illustrate a prior art air bearing slider for use in a magnetic storage system that operates in a contact start/stop mode.
Figure 1B:
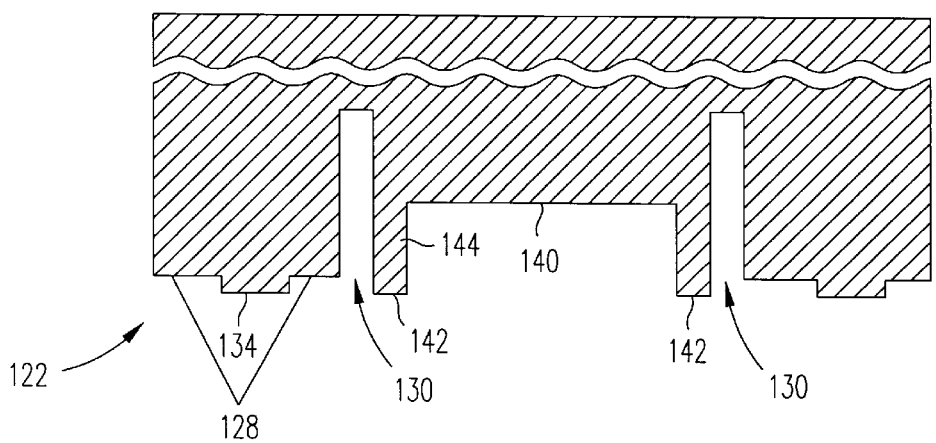
Figure 2:
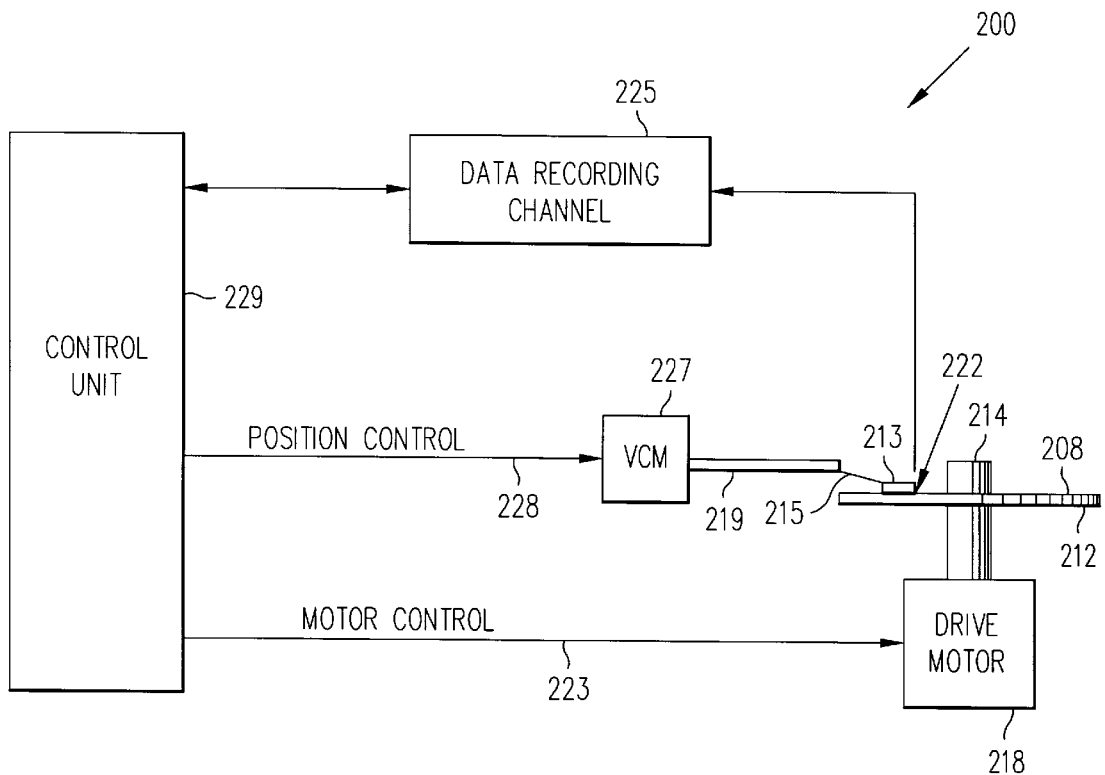
FIG. 2 illustrates a block diagram of a magnetic storage system.

FIG. 2 illustrates a magnetic storage system that may incorporate load/unload technology. Magnetic storage system 200 includes at least one rotatable magnetic disk 212 supported on a spindle 214 which is rotated by a disk drive motor 218 with at least one slider 213 positioned above disk 212 when accessing data from disk 212. Each slider 213 supports one or more magnetic read/write heads 222.

The magnetic recording media on each disk 212 includes an annular pattern of concentric data tracks (not shown). As disk 212 rotates, slider 213 is moved radially or along an arcuate path over the disk surface 208 so that data may be accessed from the selected portion of a data track via head 222.

Each slider 213 is attached on its upper surface to an actuator arm 219 by a suspension 215. The suspension 215 provides a slight spring force which biases slider 213 against disk surface 208. Each actuator arm 219 is attached to an actuator 227. The actuator 227, as shown in FIG. 2 may be a voice coil motor (VCM) that includes a coil moveable within a fixed magnetic field. Typically, the direction and velocity of the coil movements are controlled by a control signal supplied by a servo system controller.

During operation of magnetic storage system 200, the rotation of disk 212 generates an air bearing between slider 213 and disk surface 208 which exerts an upward force or positive pressure on the lower surface (or air bearing surface) of slider 213. The air bearing surface typically includes a plurality of air bearing rails or pads shaped to provide the desired flying characteristics. The positive pressure generated on these rails counterbalance the slight spring force of suspension 215 and supports the slider 213 off and slightly above disk surface 208 by a small, substantially constant spacing during operation. The slider 213 may also include negative pressure regions for counteracting the positive pressure to provide a flatter flying height profile.

The various components of magnetic storage system 200 are controlled in operation by control signals generated by control unit 229, such as access control signals and internal clock signals. The control unit 229 may include logic control circuits, memory devices, and a microprocessor. The control unit 229 generates control signals such as drive motor control signals on line 223 and head position and seek control signals on line 228. The control signals on line 228 provide the desired current profiles to optimally move and position a selected slider 213 to the desired data track on the associated disk 212. Read and write signals are communicated to and from read/write heads 221 by a recording channel 225.

The above description of magnetic storage system 200 is for representation purposes only and the present invention may include various other magnetic storage system configurations.

Figure 3:
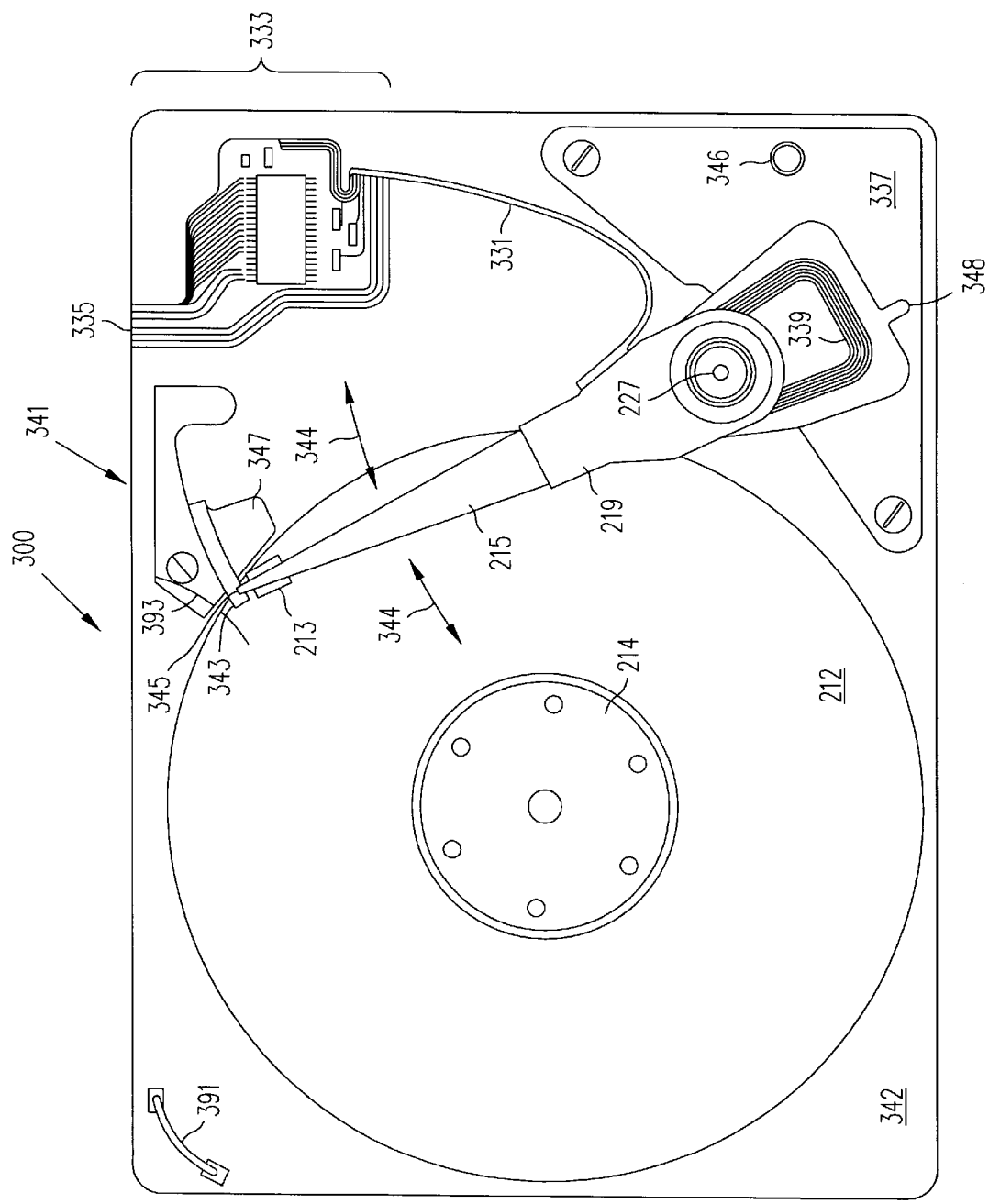
FIG. 3 illustrates a top view of a magnetic storage system that operates in a load/unload mode.

FIG. 3 illustrates a top view of one embodiment of magnetic storage system 300 that incorporates load/unload technology. More specifically, a load/unload ramp structure 341 is located at the outer perimeter of disk 212. Magnetic storage system 300 includes a rotary actuator 219 and air bearing slider 213 supporting a transducer. The actuator 219 is coupled to slider 213 via suspension 215. Suspension 215 may include a protrusion 345 at its distal end for engaging a ramp 343 of the ramp structure 341 during load/unload operations. During data access operations, actuator 219 selectively positions the transducer over the disk 212 in response to a control signal from the control servo electronics. The control servo electronics may be located on a printed circuit board attached to a base 342 of disk storage system 300. The control signal and information to be written to disk 212 are provided to actuator 219 through a connector circuit 333, which includes an arm electronics module. Information read from the disk 212 by the transducer is transmitted through a flex cable 331 and connector circuit 333 to a read/write channel, which may also be located on the printed circuit board.

The actuator 219 rotates about an axis 227 in the directions indicated by arrows 344. A voice coil 339 is provided at one end of the actuator 219 between two pairs of permanent magnets, one of which is shown by 337. The outer magnet is attached to the inner side of magnetic storage system 300. The control signal from the servo control electronics causes a current to flow in voice coil 339 and generate a magnetic flux. The flux creates force in either direction parallel to the surface of the permanent magnets 337, causing actuator 219 to move in a desired direction. Actuator movement is limited by one or more crash stops 346 that block the range of movement of protrusion 348.

During periods when data access operations are not in progress or when disk 212 is not spinning, the servo control electronics commands actuator 219 to move slider 213 away from the disk and onto load/unload ramp 343.

Figure 4:
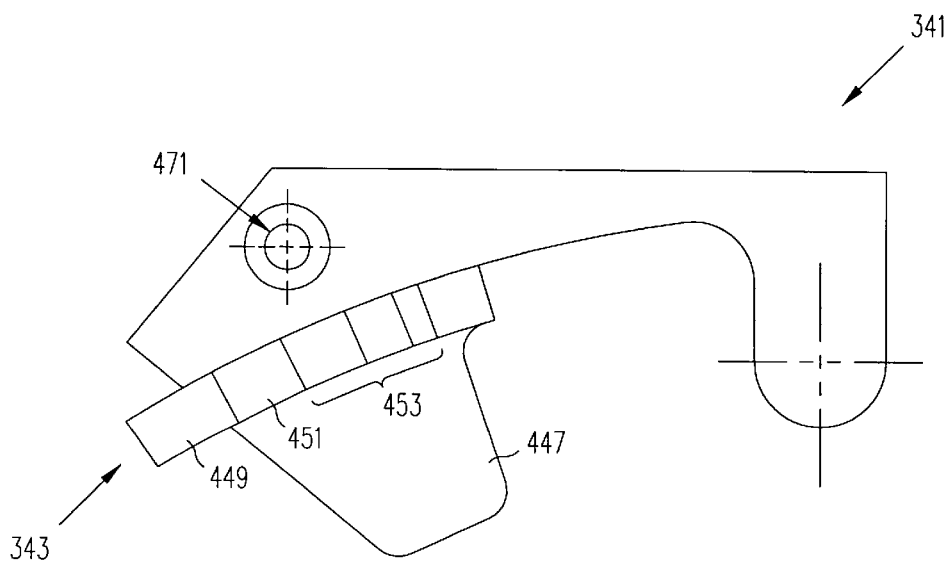
FIG. 4 illustrates a top view of a load/unload ramp structure.

FIG. 4 illustrates a top view of one embodiment of a load/unload ramp structure 341 suitable for practicing the present invention. The ramp structure 341 preferably comprises a strong and resilient plastic formed by injection molding. The plastic must be resistant to peeling or chipping to avoid contaminating the interior of disk storage system 300. The structure 341 includes ramp 343 preferably including a ramped portion 449, a plateau 451, and a detent 453. A planar limiter 447 extends outwardly from the ramp, as shown, such that it is disposed directly below the air bearing surface of the slider when the suspension is "parked" on the ramp. The ramp structure 341 is mounted to base 342 of magnetic storage system 300 proximate to the outer perimeter of the disk 212 with a screw or other mechanical means of attachment at hole 471. During unloading, a protrusion or tab 345 at the distal end of suspension 215 engages ramp 343, traveling up ramped portion 449 and across the plateau 451 before finally coming to rest in the detent 453. During loading a breaking force is applied to the actuator 219 to break the suspension free of the detent 453 onto plateau 451 and move it down ramp portion 451 before finally loading the slider above the rotating disk surface.

Figure 5:
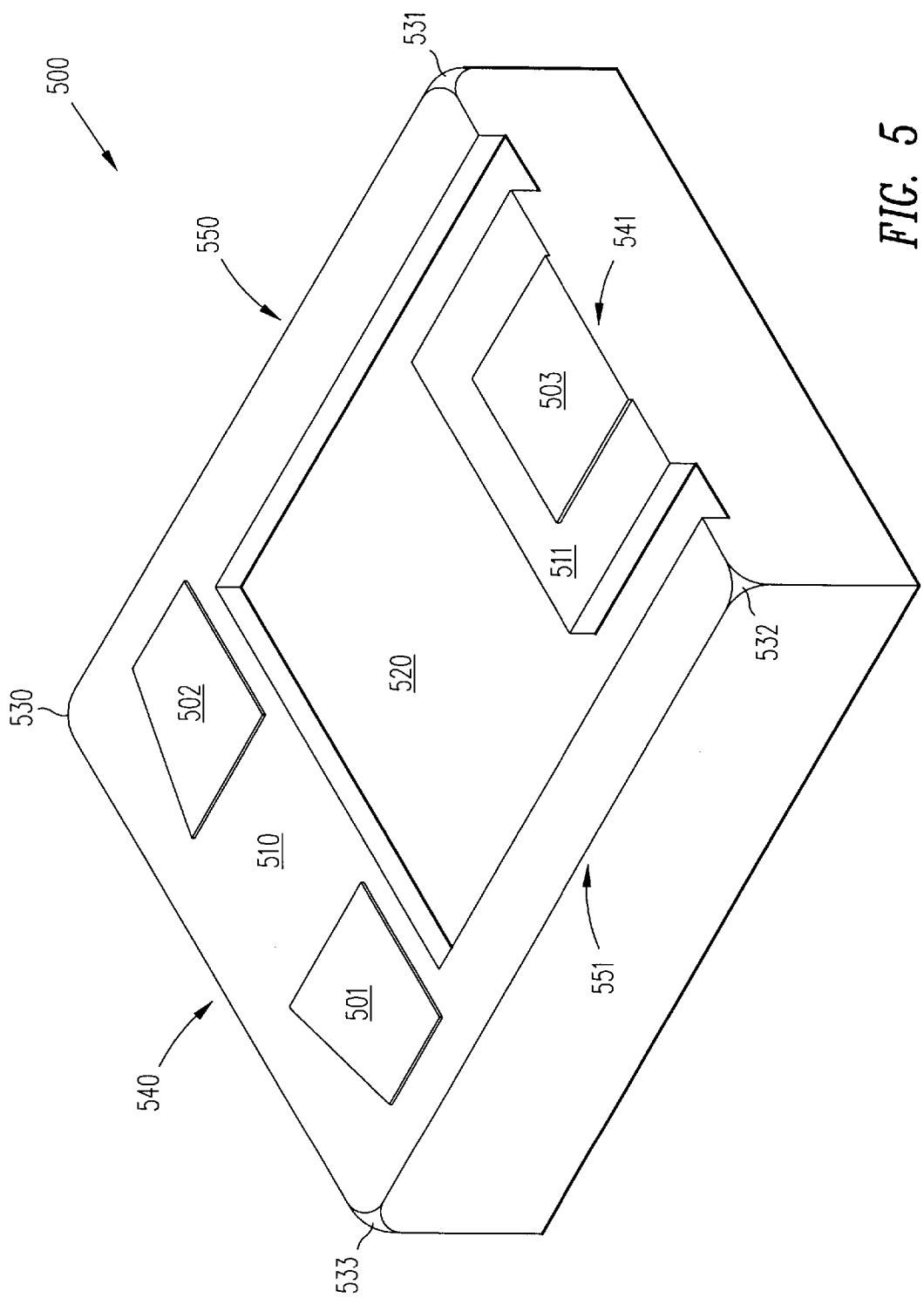
FIG. 5 illustrates a perspective view of one embodiment of the present invention.

FIG. 5 illustrates one embodiment of a slider having an air bearing design to minimize disk damage. The air bearing design of slider 500 includes leading pads 501 and 502 disposed on a first shallow step region 510. Additionally, the air bearing design of slider 500 includes a trailing pad 503 disposed on a second shallow step region 511. Leading pads 501 and 502 and trailing pad 503 form the air bearing surface of slider 500. For alternative embodiments, the number of leading pads may vary and the number of trailing pads may also vary from the design shown in FIG. 5. The shallow step regions 510 and 511 are approximately the same etch depth with respect to the air bearing surface and therefore forming the first etch surface.

According to FIG. 5, the shallow step region 510 extends along the leading edge 540 of slider 500 and has side rails that extend along the side edges 550 and 551 of slider 500. For alternative embodiments, the shallow step region 510 may not extend the entire length of leading edge 540 and the side rails may not extend the entire length of side edges 551 and/or 550, or alternatively, may extend along one or more portions of leading edge 540, side edge 551, or side edge 550. Furthermore, for other embodiments, shallow step region 510 may not be aligned with the leading and/or side edges of slider 500. In other words, shallow step region 510 may be off-set from the edges of slider 500. For example, slider 500 may include one or more stepped regions (not shown), external to shallow step region 510, that is substantially adjacent to one or more slider edges 550, 551, 540, and 541. For this embodiment, the stepped regions are recessed further away from the air bearing surface than shallow step region 510.

For one embodiment, the first etch depth is approximately 0.11 microns, but may vary for alternative embodiments, depending on the file environment and slider size. Formed between the rails of shallow step region 510 is a negative pressure region 520 having a second etch depth with respect to the air bearing surface. The negative pressure region 520 is also referred to as the second etch depth. For one embodiment, the second etch depth may be between 0.5 microns and 5.0 microns depending on the file environment and slider size.

The shallow step regions 510 and 511 or the first etch surface provide the positive pressure regions of slider 500. More specifically, the shallow step region 510 pressurizes leading pads 501 and 502 and shallow step region 511 pressurizes trailing pad 503 during operation to give slider 500 a positive lift. For the embodiment shown in FIG. 5, pressurization mainly occurs at the step transition between the shallow step regions and the air bearing pads. The negative pressure region 520, also referred to as the second etch surface, is responsible for pulling slider 500 towards the disk surface during operation. During operation, the disk is rotating and the slider is flying above the disk surface. The second etch depth is typically optimized to minimize the altitude sensitivity of slider 500 and ID-to-OD flying height variation. Furthermore, the flying height profile across the ID-to-OD is typically optimized by adjusting the depth of first etch surfaces 510 and 511, the size of air bearing pads 501, 502, and 503, and the length of the rails along side edges 550 and 551. In general, the negative and positive pressure regions of slider 500 are counterbalanced to provide a relatively flat flying height profile.

FIG. 5 illustrates rounded corners 530–533. More specifically, corners 530–533 are rounded in three dimensions to have a generally spherical shape or some other similar curvature. For alternative embodiments, side edges 551 and 550 and leading edge 540 may also be rounded to have a cylindrical shape or some other similar curvature. Because air bearing pads 501, 502, and 503 are off-set from leading edge 540 and side edges 550 and 551 of slider 500, very little pressurization is induced by the edges or corners of slider 500. As a result, the rounding of the edges or corners of slider 500 do not affect the air bearing surface of slider 500 and therefore do not adversely impact the flying height sensitivity, characteristics, or tolerances of slider 500.

For alternative embodiments, side rails formed on first etch surface 510 and along side edges 550 may not extend to trailing edge 541 of slider 500. For one embodiment, the rounded front corners 530 and 533 correspond to the corners of first etch surface 510 and the rounded rear corners 531 and 532 correspond to the corners of second etch surface 520 or another non-air bearing surface. Alternatively, first etch surface 510 may not extend to leading edge 540 of slider 500 such that the rounded front corners 530 and 533 may correspond to the corners of the second etch surface or another non-air bearing surface. Accordingly, for alternative embodiments, the rounded corners 530–533 are not limited to representing the corners of the first etch surface, which is typically the most shallow etch surface, but may be extended to represent the corners of other non-air bearing surfaces, which are deeper than the first etch surface.

For disk storage systems that incorporate load/unload technology, the rounding of the slider edges significantly reduces the damage to the disk that typically occurs during loading and/or unloading (i.e., moving slider 500 onto the load/unload ramp). As mentioned above, one drawback associated with load/unload designs is that when the slider is being "loaded" onto the disk surface, the corner of the slider may contact the disk surface before an air-bearing can be developed. This contact results in both slider wear and damage to the disk surface. Furthermore, during unloading, the suspension lifts slider 500 onto the ramp. When the suspension attempts to pull the slider 500 away from the disk surface, a suction force is created between slider 500 and the disk surface. This suction force causes slider 500 to resist begin lifted onto the ramp. While the suspension is pulling the slider 500 away from the disk surface to break the suction force, the suspension accumulates spring energy.

When the suction force finally releases, this spring energy causes slider 500 to oscillate. While oscillating, the corners and possibly the edges of slider 500 may come into contact with the disk surface because the slider 500 is not far enough up the ramp to avoid such contact.

If the corners of a slider are sharp, the impact caused by the sharp corners on the disk surface may cause excessive damage to the disk surface. Thus, by rounding the corners of slider 500, the damage caused by such contact may be significantly reduced. Similarly, the edges of a slider may be rounded to reduce the damage caused by the slider hitting the disk surface. Typically, the corners are rounded to have a spherical curved surface, or other similar curved surface, and the edges are rounded to have a cylindrical curved surface, or other similar curved surface. The rounded corners or edges may be formed by various abrasive, grinding, polishing, burnishing, etching, laser ablation, or cutting processes or other blending processes well known in the art. Generally, rounded corners or edges increases the impact area on the disk surface as compared to the concentrated impact caused by sharp corners or edges. As a result, the disk surface is less likely to be damaged when hit with a rounded corner or edge rather than a sharp corner or edge.

Although slider 500 has many desirable features for disk storage systems that incorporate load/unload technology, slider 500 may be used in disk storage systems that do not incorporate load/unload technology (e.g., contact start-stop technology). Furthermore, for alternative embodiments, the air bearing configuration may be modified for a specific file environment. For example, rather than having air bearing pads, an alternative embodiment may include air bearing rails or a combination of air bearing pads and rails. It is preferable that the air bearing surface formed by the air bearing pads or rails are off-set from the leading edge and side edges of the slider such that the rounding of the corners and edges do not adversely impact the air bearing surface of the slider.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic storage system, comprising:
    at least one storage disk having a data surface of concentric data tracks;
    a spindle motor attached to said disk and operable to rotate said disk;
    a transducer configured to read data from and write data to said data surface;
    a slider positioned to support said transducer, said slider including a support structure having an air bearing surface and a first etch surface, said first etch surface having a first etch depth with respect to said air bearing surface and at least one rounded corner;
    a suspension;
    an actuator assembly coupled to said slider via said suspension and positioned to move said slider relative to said disk surface; and
    a load/unload structure disposed at a perimeter of said disk, said slider positioned on said load/unload structure when said spindle motor is powered-down.

2. The magnetic storage system of claim 1, wherein said at least one rounded corner has a spherical curved surface.

3. The magnetic storage system of claim 1, wherein said etch surface has at least one rounded edge.

4. The magnetic storage system of claim 3, wherein said at least one rounded edge has a cylindrical curved surface.

5. The magnetic storage system of claim 1, wherein said support structure further includes a second etch surface having a second etch depth with respect to said air bearing surface, said second etch depth having a deeper etch depth than said first etch depth.

6. The magnetic storage system of claim 5, wherein said second etch surface includes at least one rounded corner.

7. The magnetic storage system of claim 6, wherein said first etch surface includes two rounded corners and said second etch surface includes two rounded corners.

8. The magnetic storage system of claim 5, wherein said support structure includes a first side edge, a second side edge, a leading edge, and a trailing edge, said second etch surface substantially (aligned) with at least a portion of one of said first and second side edges and at least a portion of one of said trailing and leading edges.

9. The magnetic storage system of claim 1, wherein said support structure further includes a second etch depth having a more shallow etch depth than said first etch depth.

10. The magnetic storage system of claim 1, wherein said first etch surface includes four rounded corners.

11. The magnetic storage system of claim 1, wherein said support structure includes a first side edge, a second side edge, a leading edge, and a trailing edge, said first etch surface substantially aligned with at least a portion of one of said first and second side edges and at least a portion of one of said trailing and leading edges.

12. A magnetic storage system, comprising:
    at least one storage disk having a data surface of concentric data tracks;
    a spindle motor attached to said disk and operable to rotate said disk;
    a transducer configured to read data from and write data to said data surface;
    a slider positioned to support said transducer, said slider including a support structure having an air bearing surface and a first etch surface, said first etch surface having a first etch depth with respect to said air bearing surface and at least one rounded corner;
    a suspension; and
    an actuator assembly coupled to said slider via said suspension and positioned to move said slider relative to said disk surface.

13. The magnetic storage system of claim 12, wherein said at least one rounded corner has a spherical curved surface.

14. The magnetic storage system of claim 12, wherein said first etch surface has at least one rounded edge.

15. The magnetic storage system of claim 14, wherein said at least one rounded edge has a cylindrical curved surface.

16. The magnetic storage system of claim 12, wherein said support structure further includes a second etch surface having a second etch depth with respect to said air bearing surface, said second etch depth having a deeper etch depth than said first etch depth.

17. The magnetic storage system of claim 16, wherein said second etch surface includes at least one rounded corner.

18. The magnetic storage system of claim 17, wherein said first etch surface includes two rounded corners and said second etch surface includes two rounded corners.

19. The magnetic storage system of claim 16, wherein said support structure includes a first side edge, a second side edge, a leading edge, and a trailing edge, said second etch surface substantially (aligned) with at least a portion of one of said first and second side edges and at least a portion of one of said trailing and leading edges.

20. The magnetic storage system of claim 12, wherein said support structure further includes a second etch depth having a more shallow etch depth than said first etch depth.

21. The magnetic storage system of claim 12, wherein said first etch surface includes four rounded corners.

22. The magnetic storage system of claim 12, wherein said support structure includes a first side edge, a second side edge, a leading edge, and a trailing edge, said first etch surface substantially aligned with at least a portion of one of said first and second side edges and at least a portion of one of said trailing and leading edges.

\* \* \* \* \*